United States Patent [19]

Becker

[11] 4,391,957

[45] Jul. 5, 1983

[54] ELASTICIZED ADDITION PRODUCT BASED ON POLYALKYLENE ETHER-POLYOLS AND POLYISOCYANATES, PREPARATION AND USE THEREOF

[75] Inventor: Wilhelm Becker, Hamburg, Fed. Rep. of Germany

[73] Assignee: Hoechst Aktiengesellschaft, Fed. Rep. of Germany

[21] Appl. No.: 399,791

[22] Filed: Jul. 19, 1982

[30] Foreign Application Priority Data

Jul. 21, 1981 [DE] Fed. Rep. of Germany ....... 3128733

[51] Int. Cl.$^3$ ............................................. C08G 18/38
[52] U.S. Cl. ..................................... 525/454; 528/49; 528/62; 528/65; 528/66; 528/73
[58] Field of Search ................... 525/454; 528/62, 65, 528/66, 73, 49

[56] References Cited

U.S. PATENT DOCUMENTS

| | | | |
|---|---|---|---|
| 2,995,530 | 8/1961 | Frisch et al. | 528/73 |
| 4,200,725 | 4/1980 | Gras et al. | 528/73 |

*Primary Examiner*—Maurice J. Welsh
*Attorney, Agent, or Firm*—Hammond & Littell, Weissenberger and Muserlian

[57] ABSTRACT

An elasticized addition product formed from (a) polyalkylene ether-polyols having a molecular weight of 500 to 10,000 and 2 to 6 C atoms in the alkylene radical and (b) polyisocyanates, the ratio of the NCO groups of the component (b) to the OH groups of the component (a) being 1.5:1 to 2.5:1, and the addition product of (a) with (b) is further reacted with hydroxyl compounds from the group comprising (c) imidazolidine of a particular formula and/or (d) hexahydropyrimidine derivatives of a particular formula in an approximately 1:1 ratio of NCO groups to the OH groups of the components (c) and/or (d), and is in the form of this reaction product and/or in the form of a hydrolysis product thereof. Mixtures based on (A) the said addition product as the curing agent and (B) epoxide compounds containing more than one epoxide group, if appropriate together with monoepoxide compounds, are used for the production of molded articles having controlled resilience properties, such as sheet-like structures, adhesive bonds and casting compositions.

9 Claims, 1 Drawing Figure

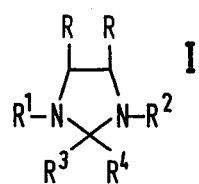 I
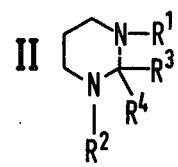 II
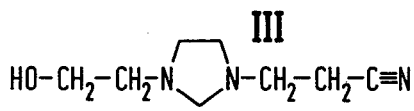 III
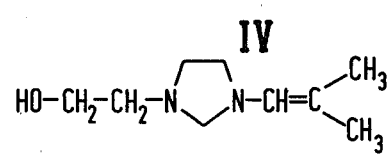 IV
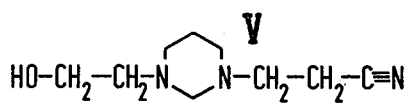 V
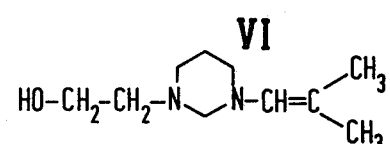 VI
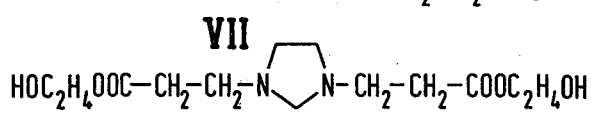 VII
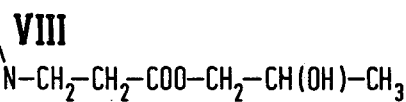 VIII
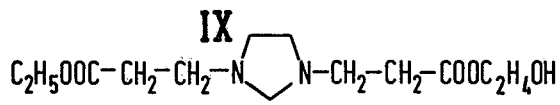 IX
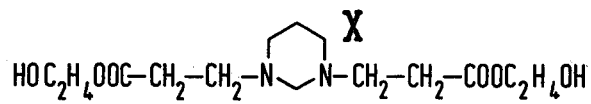 X
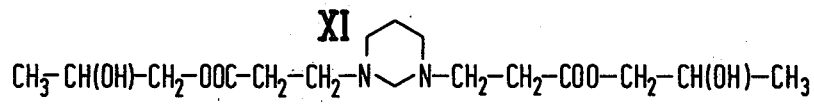 XI
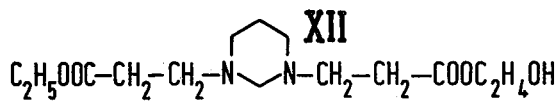 XII

ELASTICIZED ADDITION PRODUCT BASED ON POLYALKYLENE ETHER-POLYOLS AND POLYISOCYANATES, PREPARATION AND USE THEREOF

Epoxide resins have been widely used for a long time for the preparation of anti-corrosion paints, abrasion-resistant coatings, casting compositions and adhesives which have excellent mechanical strength and good resistance to chemicals. Because of their high density of crosslinking, amine-cured epoxide resins, above all those based on bisphenol A and epichlorohydrin, are brittle; they have glass transition temperatures above 20° C.

In practice, the great hardness and high strength of amine-cured epoxide resins are not always necessary; at the same time, elasticization and reduction of brittleness is frequently desired. Various methods have hitherto been used in order to achieve this, but these have still caused embrittlement of the products at low temperatures and, in addition, have not always given satisfaction because of insuffucient long-term resilience and, in some cases, an undesirable subsequently continuing hardening.

In principle, the degree of elasticization can be increased by reducing the density of crosslinking of the resin (internally) or by adding plasticizers to the resin (externally).

Plasticizers are not reactive and are therefore not incorporated into the network of the cured resin. They effect an opening up of the network only by filling up space. Examples of plasticizers include tar, esters of phthalic acid, high-boiling alcohols, polyglycols, ketone resins, vinyl polymers and similar products which do not react with epoxide resins and amine curing agents. This type of modification is only suitable for specific uses. It hardly makes any contribution towards elasticization, since the glass softening range is not substantially affected, but the structure of the cured resin is distorted considerably.

Internal elasticization of epoxide resins can be achieved, for example, by reducing the functionality of the curing agent. However, this does not result in adequate crosslinking and thus leads to inadequate mechanical strength properties.

Internal plasticization of epoxide resins can also be achieved by reacting excess quantities of an epoxide resin with castor oil, in the course of which the hydroxyl groups of the castor oil react with a fraction of the epoxide groups. The disadvantages mentioned above apply to this too.

Long-chain aminoamides of low functionality based on dimeric and trimeric fatty acids have already been customary for a long time and on a considerable scale. A satisfactory pattern of properties can be achieved by this means; but these soft curing agents are not as universally applicable as would be desirable, owing to the lack of internal plasticization.

It is also known to modify systems composed of epoxide resins and aminoamides by mixing in polyurethanes. This system has been developed further in the direction of elasticized plastics as a result of the process described in German Offenlegungsschrift No. 2,152,606. However, systems of this type still do not have the required stability on storage.

In addition, a process is known for elasticization by reacting epoxide compounds with curing agents which are addition products formed from polyalkylene ether-polyols and polyisocyanates in which the ratio of NCO groups to OH groups is (1.5 to 2.5):1, and these addition products are reacted further with ketimines and/or enamines containing hydroxyl groups, the ratio of NCO groups to OH groups then being 1:1. These products also have too low a density of crosslinking.

It was therefore desirable to prepare compounds which escape these disadvantages.

The invention relates to an elasticized addition product comprising (a) a polyalkylene ether-polyol and (b) a polyisocyanate wherein (a) has a molecular weight of 500 to 10,000 and 2 to 6 C atoms in the alkylene radical and the ratio of the NCO groups in the component (b) to the OH groups in the component (a) is 1.5:1 to 2.5:1, the addition product thereof is reacted further with a hydroxyl compound selected from the group consisting of (c) an imidazolidine of the formula I (see claim 1), wherein R is hydrogen or alkyl having 1 to 4 C atoms, $R^1$ is (c1) hydrogen, (c2) hydroxyalkyl and alkyl having 1 to 12 C atoms in each case, (c3) —CH$_2$—R$^5$, (c4) —CH$_2$—CH$_2$—COOR$^5$,

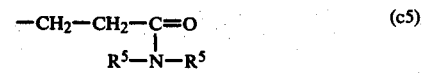

or (c6) —CH$_2$—CH$_2$—CN, wherein R$^5$ represents in each case hydroxyalkyl or alkyl having up to 8 C atoms, R$^2$ denotes (c7) alkyl or alkylene having in each case 1 to 12 C atoms or denotes one of the radicals (c3) to (c6), R$^3$ and R$^4$ each denote hydrogen or alkyl having 1 to 5 C atoms or R$^3$ and R$^4$ together denote alkylene having 4 to 6 C atoms, and (d) a hexahydropyrimidine derivative of the general formula II (see claim 1), wherein R$^1$ to R$^5$ have the meaning as mentioned under (c) at least one of each of the substituents R$^1$ to R$^5$ in the formulae (I) and (II) carrying a hydroxyl group; the ratio of NCO groups to the OH groups of component (c) and (d) or a mixture thereof is approximately 1:1. The addition product is in the form of this reaction product and/or in the form of the hydrolysis product thereof.

The scope of the invention includes a process for the preparation of the elasticized addition products.

The scope of the invention also includes a composition comprising a mixture of (A) at least one elasticized addition product according to the invention as a curing agent for (B) epoxide compounds having more than one epoxide group per molecule or combinations thereof with monoepoxide compounds on their own or together with (C) further customary additives. These mixtures cure to give elastic products, for example molded articles having fault-free advantageous physical and chemical properties.

The mixtures can also contain, as the curing agent (A), mixtures of reaction products of the compounds (a) to (c) or (d).

The products according to the invention constitute curing agents and are polyurethanes having terminal amino groups.

In general, linear or branched polyalkylene ether-polyols, preferably polypropylene oxides, are suitable as starting adducts for the preparation. In general, products having an average molecular weight between 2,000 and 5,000 are used preferentially. The following may be mentioned as examples of polyisocyanates: 2,4-toluylene diisocyanate, 2,6-toluylene diisocyanate, 4,4-diphenylmethane diisocyanate, m-xylylene diisocyanate, 2,2,4-(2,4,4)-trimethylhexamethylene diisocyanate, 1,6-hexamethylene diisocyanate, 1-isocyanato-3-isocyanatomethyl-3,5,5-trimethylcyclohexane (isophorone diisocyanate) and the addition product formed from 1 mole of trimethylolpropane and 3 moles of isophorone diisocyanate. Aliphatic and cycloaliphatic diisocyanates, such as hexamethylene diisocyanate and isophorone diisocyanate, but also toluylene diisocyanate, are particularly suitable, in each case individually or as a mixture.

The starting adducts are prepared by warming the reaction mixture for a period, for example a few hours, at, for example, 50° to 100° C., in a manner which is in itself known after adding a suitable catalyst, such as 0.1% of dibutyltin dilaurate, until the isocyanate content determined by analysis agrees substantially with the calculated value. It is also possible, however, initially to take one reactant, for example the polyisocyanate, and to add the polyalkylene ether-polyol under the reaction conditions.

The preparation of the starting components (c) or (d), i.e. the imidazolidine or hexahydropyrimidine derivatives containing hydroxyl groups, is effected, for example, by cyclizing aminoalkylenealkanolamines which can carry either a primary or secondary hydroxyl group or a primary and a secondary amino group or two secondary amino groups, by means of aldehydes with elimination of water, and adding on, to any basic hydrogen which may still be present, compounds containing activated C=C double bonds, for example an acrylic compound, such as acrylonitrile, acrylamide, an alkyl acrylate and/or a hydroxyalkyl acrylate, or by reacting the basic hydrogen which may be present with an aldehyde, with the elimination of water. It is also possible, however, to use as starting materials alkylenediamines which are substituted by alkyl radicals, if a hydroxyalkyl acrylate is added onto the remaining secondary basic hydrogen atom. It is also possible to react an alkylenediamine, for example ethylenediamine or propylenediamine, in a molar ratio of 1:2 with ($\alpha$) hydroxyalkyl acrylates or ($\beta$) mixtures of equal molar quantities of hydroxyalkyl acrylates and alkyl acrylates, acrylonitrile and/or acrylamide, and subsequently to cyclize the product by means of aldehydes and/or ketones.

Examples of suitable aminoalkylalkanolamines are aminoethylethanolamine, aminoethylpropanolamine, aminoethylisopropanolamine, aminoethylbutanolamine and the corresponding aminopropyl derivatives.

Aliphatic aldehydes, such as formaldehyde, acetaldehyde or isobutyraldehyde, or aliphatic or cyclic ketones, such as methyl isobutyl ketone, diisopropyl ketone, diisobutyl ketone, cyclohexanone, trimethylcyclohexanone or the like, are particularly suitable for the cyclization of the aminoalkylalkanolamines or for the conversion of the cyclization products, for example those formed from 1 mole of alkylenediamine and 2 moles of the compounds containing activated C=C double bonds.

The cyclization is effected, for example, by mixing the starting compounds, i.e. aminoalkylalkanolamines and carbonyl compounds, in an equivalent ratio, or with an excess of the carbonyl compound, and, after adding an entraining agent and, if necessary, an acid catalyst, heating the mixture under a water separator until the separation of water is complete. After the entraining agent and the excess carbonyl component have been removed by distillation, the residue is, if appropriate, distilled. The starting materials are mixed with the imidazolidines or hexahydropyrimidines containing hydroxyl groups at ambient temperature or at an elevated temperature up to 150° C., preferably in the range from 50° to 150° C., in a 1:1 NCO:OH ratio and the mixture is stirred until, for example, an NCO band can no longer be detected in the infrared spectrum.

The mixtures can contain the elasticized adducts, according to the invention, containing imidazolidine or hexahydropyrimidine end groups, as curing agents, directly mixed with the polyepoxides or with a further curing agent and the polyepoxides, the amino group being liberated in general by residual moisture present or by the moisture of the atmosphere. Curing is therefore advantageously carried out in the presence of water.

However, the amino groups can also be liberated directly in the freshly prepared adduct by introducing steam or by adding water and warming.

The curing agents (A) according to the invention are stable on storage. They can be mixed with commercially available low-molecular amine curing agents which are known per se and which contain at least 2 reactive amine hydrogen bonds, with the formation of mixtures which are also stable on storage. In the course of this, the viscosity of the curing agents according to the invention is generally reduced substantially and the reactivity of the mixture is increased, particularly if reacted with epoxide compounds. However, it is also possible for the mixtures of the components (A) to (C) to contain, in addition, diluents, such as benzyl alcohol, pine oil, the customary plasticizers, such as phthalates, or the like, in each case on their own or together with the amine curing agents.

Examples of customary amine curing agents are aliphatic amines, for example polyethylenepolyamines and polypropylenepolyamines, for example diethylenetriamine, dipropylenetriamine and triethylenetetramine; cycloaliphatic diamines, such as 1-amino-3-aminomethyl-3,5,5-trimethylcyclohexane (isophorone diamine) or 3,3'-dimethyl-4,4'-diaminodicyclohexylmethane; heterocyclic amines, such as piperazine; long-chain polyether-amines, such as 1,12-diamino-4,8-dioxadodecane; aromatic amines, such as phenylenediamine or diaminodiphenylmethane; polyamidoamines formed from natural or synthetic fatty acids and polyamines; amine adducts; and phenol aldehyde-amine condensation products. Furthermore, compounds which split off amines, such as ketimines or enamines, are also suitable. These compounds which split off amines are particularly advantageous for the preparation of one-component mixtures with epoxide resins.

The great possibility of variation in respect of different functionalities and viscosities in combining the additional known curing agents with the curing agents according to the invention also produces a multifarious range of variation in processing, and in achieving desirable properties in the cured mixture.

The curing agents can be mixed in a known manner with viscosity regulators and accelerators, such as tertiary amines, triphenyl phosphite or alkylphenols, or with rapid curing agents, such as Mannich bases.

The mixtures of the components (A) to (C) can be cured within a wide range of temperature, i.e. both at low temperatures, for example 10–50, preferably 15–25, °C., and at elevated temperatures, for example 50–150, preferably 80–110, °C. In general, the epoxide compounds contain on average more than one epoxide group in the molecule and they have an epoxide equivalent of 150 to 1,000, preferably 170 to 250, and a molecular weight of 300 to 2,000, preferably 330 to 600. They can be, for example, glycidyl ethers of polyhydric alcohols, such as glycerol or hydrogenated bisphenol A, or of polyhydric phenols, such as resorcinol, bisphenol A, diphenylolmethane or phenol-aldehyde condensation products. It is also possible to use the glycidyl esters of polybasic carboxylic acids, such as hexahydrophthalic acid or dimerized fatty acids. The use of liquid epoxide resins based on epichlorohydrin and bisphenol A and having a molecular weight of 340 to 450 is particularly preferred.

If appropriate, additional monofunctional epoxide compounds can be used to reduce the viscosity of the mixtures according to the invention and thus to improve their processability. Examples of these are aliphatic and aromatic glycidyl ethers, such as butyl glycidyl ether or phenyl glycidyl ether, or glycidyl esters, such as glycidyl acrylate, or epoxides, such as styrene oxide.

Combination of the elasticized adducts according to the invention in the form of long-chain, slightly crosslinked polyether urethane-amines, polyether urethane-imidazolidines or polyether urethane-hexahydropyrimidines with highly crosslinked amine formulations makes it possible to adjust the properties of the reactive mixtures in respect of viscosity and reactivity and also the properties of the cured resin in respect of resilience, density of crosslinking, mechanical strength and resistance to chemicals.

The customary fillers based on minerals, pigments, plasticizers, accelerators, solvents and miscellaneous additives are suitable for the preparation of a reactive mixture of the components (A) to (C) for coating or gluing or for casting.

Examples of suitable inorganic fillers are mineral powders, such as ground minerals, ground shale, powdered marble, quartz powder, quartz sand, chalk, glass powder, asbestos and graphite, and metal powders, metal turnings and metal oxides. The following are mentioned as examples of organic fillers: cellulose fibers, such as wood flour and sawdust.

The following are examples of suitable organic pigments: phthalocyanine, quinacridone and anthraquinone compounds or the like. Examples of suitable inorganic pigments are the known metal oxides and sulfides and the like.

Suitable plasticizers are the known esters of phthalic acid and sebacic acid, examples of suitable accelerators are tertiary amines, phenols and salicylic acid, and examples of suitable solvents are benzyl alcohol, aromatic hydrocarbons, such as toluene or xylene, or the like.

The mixtures composed of (A) to (C) can be used for the production, by curing, of molded articles having controlled resilience properties, which are also understood to include casting compositions and sheet-like structures, such as coatings and adhesive bonds, with particular advantage in cases where good adhesion to the substrate, good resistance to chemicals and resilience for bridging over cracks in the substrate and for removing internal stresses are required.

An important field of use is the lining and covering of articles and the production of coatings, such as the coating of concrete, for example coating fuel oil tanks. Because of their excellent adhesion to iron and concrete and their controllable resilience, the mixtures according to the invention are suitable for use as casting compositions for joints and adhesives having a high bond strength. The fact that curing takes place with surprisingly little shrinkage and stress also makes it possible to produce molded articles which can have large dimensions.

In the following examples, % always denotes % by weight.

EXAMPLES

I. The preparation of the starting materials (Formulae III to XII in the sheet of formulae) is described in Examples 1 to 10, it being possible to process the resulting products further in all cases or to free them from impurities in a high vacuum.

(1) 1-$\beta$-Hydroxyethyl-3-$\beta$-cyanoethylimidazolidine 104.2 g (1 mole) of aminoethylethanolamine and 34 g of 91% strength paraformaldehyde were dissolved in 300 ml of toluene in a three-necked flask equipped with a stirrer, a water separator and a reflux condenser, and the mixture was heated to the boil under reflux and with circulatory removal of water (i.e. removal of water and subsequently recycling the distillate). The calculated quantities of water had been removed from the system after 3 hours. 53 g of acrylonitrile were then added dropwise in the course of 60 minutes at 60°–70° C., while cooling. The addition reaction was completed in 2 hours at 60°–70° C. Toluene was then removed under reduced pressure. The crude imidazolidine of the formula III was obtained as a liquid of low viscosity. Its hydroxyl equivalent was approx. 169.

(2)
1-$\beta$-Hydroxyethyl-3-(2-methyl)-propen-(1,2)-ylimidazolidine

The initial procedure was as in Example 1. After the calculated quantity of water had been removed, 72 g of isobutyraldehyde were added dropwise in the course of 60 minutes with further circulatory removal of water. After the calculated quantity of water had been separated off, the toluene was removed under reduced pressure. This gave the crude imidazolidine of the formula IV. Its hydroxyl equivalent was approx. 170.

(3)
1-$\beta$-Hydroxyethyl-3-$\beta$-cyanoethylhexahydropyrimidine

The procedure was similar to that of Example 1, but 118.2 g (1 mole) of aminopropylethanolamine were used as the starting material. This gave the crude compound of the formula V. Its hydroxyl equivalent was approx. 183.

(4)
1-$\beta$-Hydroxyethyl-3-(2-methyl)-propen-(1,2)-ylhexahydropyrimidine

The procedure was similar to that of Example 2, but 118.2 g (1 mole) of aminopropylethanolamine were used as the starting material. This gave the crude compound of the formula VI. Its hydroxyl equivalent was approx. 184.

(5)
N,N'-Bis-(hydroxyethyl-$\beta$-carboethoxy)-1,3-imidazolidine 33.5 ml (0.5 mole) of ethylenediamine and 200 ml of toluene were put into a three-necked flask equipped with a stirrer, a dropping funnel, an attachment for water separation and a reflux condenser fitted with a drying tube. The solution was cooled to approx. 0° C.; 116 g (1 mole) of hydroxyethyl acrylate were then added dropwise slowly at 0° to 5° C. The cooling was then removed; the temperature of the contents of the flask rose to room temperature in about one hour. The mixture was stirred for a further 3 hours at room temperature; 16.5 g (0.5 mole) of 91% strength paraformaldehyde were then added and the reaction mixture was heated and water was removed by circulation. The calculated quantity of water had been separated off by azeotropic distillation in the course of 1½–2 hours. The toluene was removed under reduced pressure. This gave the crude compound of the formula VII. Its hydroxyl equivalent was about 152.

(6)
N,N'-Bis-(hydroxyisopropyl-β-carboethoxy)-1,3-imidazolidine

The procedure was similar to that in Example 5, but 130 g (1 mole) of hydroxyisopropyl acrylate were added on. This gave the crude compound of the formula VIII. Its hydroxyl equivalent was about 166.

(7)
N-Hydroxyethyl-β-carboethoxy-(N'-ethyl-β-carboethoxy)-1,3-imidazolidine

The procedure was similar to that of Example 5, but an equimolar mixture of 58 g (0.5 mole) of hydroxyethyl acrylate and 50 g (0.5 mole) of ethyl acrylate was added on. This gave the crude compound of the formula IX. Its hydroxyl equivalent was about 288.

(8)
N,N'-Bis-(hydroxyethyl-β-carboethoxy)-hexahydropyrimidine

The procedure was similar to that of Example 5. However, instead of the ethylenediamine, 37 g (0.5 mole) of propylenediamine were employed. This gave the crude compound of the formula X. Its hydroxyl equivalent was about 159.

(9)
N,N'-Bis-(hydroxyisopropyl-β-carboethoxy)-hexahydropyrimidine

The procedure was similar to that of Example 6. However, instead of the ethylenediamine, 37 g (0.5 mole) of propylenediamine were employed. This gave the crude compound of the formula XI. Its hydroxyl equivalent was about 173.

(10)
N-Hydroxyethyl-β-carboethoxy-(N'-ethyl-β-carboethoxy)-hexahydropyrimidine

The procedure was similar to that of Example 7. However, instead of the ethylenediamine, 37 g (0.5 mole) of propylenediamine were employed. This gave the crude compound of the formula XII. Its hydroxyl equivalent was about 302.

II. Preparation of the starting adducts (prepolymers)

(11) 174 g of toluylene diisocyanate (mixture of isomers) and 0.2 g of dibutyltin dilaurate were warmed at 60° C. under a protective gas and were mixed in the course of 2 hours with 1,000 g of a polyoxypropylene glycol having an average molecular weight of 2,000. The mixture was kept at 60°–70° C. until the NCO content (about 3.27%) was constant. The prepolymer was stored under conditions in which moisture was excluded.

(12) Example 11 was repeated using 131 g of toluylene diisocyanate (mixture of isomers). The NCO content was 2.6%.

(13) Example 11 was repeated using 222.3 g of 3-isocyanatomethyl-3,5,5-trimethylcyclohexyl isocyanate (IPDI=isophorone diisocyanate). The NCO content was 3.4%.

(14) Example 11 was repeated using 210.3 g of 2,2,4-(2,4,4)-trimethylhexamethylene diisocyanate (TMDI). The NCO content was 3.45%.

(15) Example 11 was repeated using 168.5 g of hexamethylene diisocyanate. The NCO content was 3.55%.

(16) 174 g of toluylene diisocyanate (mixture of isomers) and 0.2 g of dibutyltin dilaurate were warmed at 60° C. under a protective gas and were mixed in the course of 2 hours with 1,400 g of a polyoxypropylenetriol having an average molecular weight of 4,200. The mixture was kept at 60°–70° C. until the NCO content (about 2.6%) was constant. The prepolymer was stored in a condition in which moisture was excluded.

Examples 17 to 20

The procedure was similar to that of Example 16, using the following quantities of diisocyanate:

(17) 131 g of toluylene diisocyanate: (2.7% of NCO)
(18) 222.3 g of isophorone diisocyanate: (2.35% of NCO)
(19) 210.3 g of trimethylhexamethylene diisocyanate: (2.38% of NCO)
(20) 168.5 g of hexamethylene diisocyanate: (2.43% of NCO)

III. Preparation of the elasticized adducts according to the invention from the imidazolidines or hexahydropyrimidines of Examples 1–10 and the isocyanate-polyol prepolymers of Examples 11–20

The components containing hydroxyl groups (Examples 1–10) are mixed with the components containing isocyanate groups (Examples 11–20) in such proportions that 1 equivalent of isocyanate can react. Depending on the viscosity of the components, the reaction can be carried out at room temperature or at an elevated temperature of up to 150° C., preferably a temperature within the range from 60° to 100° C. It is also possible to carry out the reaction in an inert solvent, such as xylene or toluene which, if appropriate, is removed again after the reaction. The complete progress of the reaction can be followed by infrared spectroscopy or titrimetrically.

The multifarious possibilities are demonstrated in a few examples.

(21) 500 g of the prepolymer according to Example 11 having an NCO content of 3.27% were warmed at 70° C. and 66 g of the hydroxyl component according to Example 1 were added in approx. 2 hours with the exclusion of moisture. Stirring was then continued for approx. 5 hours at 70°–80° C., until NCO could no longer be detected. The hydrogen equivalent of the reaction product was 725.

(22) 500 g of the prepolymer according to Example 12 having an NCO content of 2.6% were warmed at 70° C. and 52.5 g of the hydroxyl component according to Example 1 were added in approx. 2 hours with the exclusion of moisture. Stirring was then continued for approx. 5 hours at 60°–70° C., until NCO could no longer be detected. Hydrogen equivalent 893.

(23) 68.5 g of the hydroxyl component according to Example 1 were added, in the course of approx. 3 hours, at 20°-30° C. and with the exclusion of moisture, to 500 g of the prepolymer according to Example 13, which had an NCO content of 3.4%. After about 15 hours NCO could no longer be detected. Hydrogen equivalent 701.

(24) 69.5 g of the hydroxyl component according to Example 1 were added, in the course of approx. 3 hours, at 20°-30° C. and with the exclusion of moisture, to 500 g of the prepolymer according to Example 14, which had an NCO content of 3.45%. After about 15 hours NCO could no longer be detected. Hydrogen equivalent 694.

(25) 71.5 g of the hydroxyl component according to Example 1 were added, in the course of approx. 3 hours, at 20°-30° C. and with the exclusion of moisture, to 500 g of the prepolymer according to Example 15, which had an NCO content of 3.55%. After about 15 hours NCO could no longer be detected. Hydrogen equivalent 678.5.

(26) 133 g of a 40% strength by weight solution in toluene of the hydroxyl component according to Example 1 were added, in the course of approx. 3 hours, at 20°-30° C. and with the exclusion of moisture, to 500 g of the prepolymer according to Example 16, which had an NCO content of 2.6%. After about 15 hours NCO could no longer be detected. The toluene was removed under reduced pressure. Hydrogen equivalent 892.

(27) 500 g of the prepolymer according to Example 16 having an NCO content of 2.6% by weight were warmed at 70° C. and 52.5 g of the hydroxyl component according to Example 2 were added in the course of approx. 2 hours, with the exclusion of moisture. Stirring was then continued for approx. 6 hours at 70°-80° C., until NCO could no longer be detected. Hydrogen equivalent 592.

(28) g of the prepolymer according to Example 17 having an NCO content of 2.7% by weight were warmed at 70° C. and 59 g of the hydroxyl component according to Example 3 were added in the course of approx. 2 hours, with the exclusion of moisture. Stirring was then continued for approx. 6 hours at 70°-80° C. until NCO could no longer be detected. Hydrogen equivalent 869.

(29) 500 g of the prepolymer according to Example 20 having an NCO content of 2.43% by weight were warmed at 70° C. and 53.2 g of the hydroxyl component according to Example 4 were added in the course of approx. 2 hours, with the exclusion of moisture. Stirring was then continued for approx. 6 hours at 70°-80° C., until NCO could no longer be detected. Hydrogen equivalent 632.

The hydroxyl compounds of Examples 1 to 10 and the prepolymers according to Examples 11 to 20 can also be used analogously for the reaction in equivalent proportions, in each case as individuals or as a mixture.

IV. Hydrolysis

In order to effect hydrolysis, water, in an excess of 110°-200%, calculated on the hydrolyzable groups in the reaction products, is added to the reaction products of the examples, and the mixture is stirred at an elevated temperature of 50° to 150° C., preferably 70° to 100° C., until it is homogeneous. The quantity of water can also be added dropwise to the reaction products in the course of 30 to 300 minutes within the temperature range from 100° to 150° C., and the mixture is then stirred until hydrolysis is complete.

V. Use

(30) 72.5 g of the product from Example 21 were made into a homogeneous mixture with 18.5 g of a diglycidyl ether based on bisphenol A and epichlorohydrin. Part of the mixture was applied to a sheet of glass and to a metal sheet to form a layer 300μ thick. After 48 hours it had cured to form a highly elastic, firmly adhering coating. The other part was cast in a mold provided with a release agent and were cured for 24 hours at 40° C. A highly elastic casting was formed, which had a high elongation at break and still had not become brittle at temperatures of 0° to −10° C.

(31) 72.5 g of the product from Example 21 and 72.5 g of a polyamidoamine formed from dimerized tall oil fatty acid and a polyethylenepolyamine having a hydrogen equivalent of 115 were mixed with 146 g of a diglycidyl ether based on bisphenol A and epichlorohydrin. The mixture was cast in a mold provided with a release agent and cured for 24 hours at 50° C. A highly elastic casting was formed, which had a high elongation at break and did not become brittle at temperatures of 0° to −10° C.

(32) Example 30 was repeated, but the product from Example 21 was employed in a hydrolyzed form. After curing, the same results were achieved as in Use Example 30.

(33) Example 31 was repeated, but the product from Example 21 was employed in a hydrolyzed form. After curing, the same results were achieved as in Example 31.

I claim:
1. An elasticized addition product comprising
 (a) a polyalkylene ether-polyol and
 (b) a polyisocyanate wherein (a) has a molecular weight of 500 to 10,000 and 2 to 6 C atoms in the alkylene radical and the ratio of the NCO groups in the component (b) to the OH groups in the component (a) is 1,5:1 to 2,5:1, the addition product thereof is reacted further with a hydroxyl compound selected from the group consisting of
 (c) an imidazolidine of the formula I

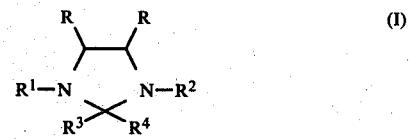

wherein R is hydrogen or alkyl having 1 to 4 C atoms, R¹ is
(c1) hydrogen,
(c2) hydroxyalkyl and alkyl having 1 to 12 C atoms in each case,
(c3) —CH₂—R⁵,
(c4) —CH₂—CH₂—COOR⁵,

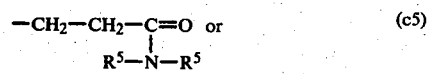

(c6) —CH₂—CH₂—CN
wherein R⁵ represents in each hydroxyalkyl or alkyl having up to 8 C atoms, R² denotes (c7) alkyl or alkylene having in each case 1 to 12 C atoms or denotes one of the radicals (c3) to (c6), $R^3$ and $R^4$ each denote hydrogen or alkyl having 1 to 5 C atoms or $R^3$ and $R^4$ together denote alkylene having 4 to 6 C atoms, and (d) a hexahydropyrimidine derivative of the general formula

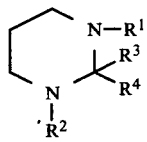
(II)

wherein $R^1$ to $R^5$ have the meaning as mentioned under (c), at least one of each of the substituents $R^1$ to $R^5$ in the formulae (I) and (II) carrying a hydroxyl group; the ratio of NCO groups to the OH groups of component (c) and (d) or a mixture thereof is approximately 1:1.

2. Addition product as claimed in claim 1 which is partly or completely hydrolyzed.

3. A process for the preparation of an elasticized addition product comprising the steps: reacting (a) a polyalkylene ether-polyol having a molecular weight of 500 to 10,000 and 2 to 6 C atoms in the alkylene radical with (b) a polyisocyanate at a temperature of 50° to 100° C. in the presence of a catalyst, the ratio of the NCO groups in the component (b) to the OH groups in the component (a) being 1.5:1 to 2.5:1, followed by further reacting the product of (a) with (b) at ambient or at a temperature up to 150° C. with a hydroxyl compound selected from the group consisting of:

(c) an imidazoline of the formula I

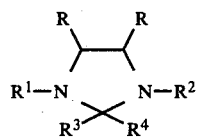
(I)

wherein R is hydrogen or alkyl having 1 to 4 C atoms, $R^1$ is (c1) hydrogen, (c2) hydroxyalkyl and alkyl having 1 to 12 C atoms in each case, (c3) —$CH_2$—$R^5$, (c4) —$CH_2$—$CH_2$—$COOR^5$,

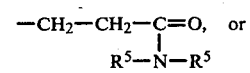
(c5)

(c6) —$CH_2$—$CH_2$—CN wherein $R^5$ represents in each case hydroxyalkyl or alkyl having up to 8 C atoms, $R^2$ denotes (c7) alkyl or alkylene having in each case 1 to 12 C atoms or denotes one of the radicals (c3) to (c6), $R^3$ and $R^4$ each denote hydrogen or alkyl having 1 to 5 C atoms or $R^3$ and $R^4$ together denote alkylene having 4 to 6 C atoms, and (d) a hexahydropyrimidine derivative of the general formula

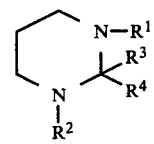
(II)

wherein $R^1$ to $R^5$ have the meaning as mentioned under (c), at least one of each of the substituents $R^1$ to $R^5$ in the formulae (I) and (II) carrying a hydroxyl group and the ratio of NCO groups to the OH groups of component (c) and (d) or a mixture thereof is approximately 1:1, and isolating the product so produced.

4. A process as claimed in claim 3 wherein the elasticized addition product is subsequently at least partially hydrolyzed.

5. A composition comprising a mixture of (A) at least one elasticized addition product as claimed in claim 1 as a curing agent and (B) an epoxide compound having more than one epoxide group per molecule or combinations thereof with monoepoxide compounds, alone or together with (C) further customary additives.

6. Composition as claimed in claim 5 wherein component (C) is at least in part, a customary amine curing agent, a diluent or a mixture thereof.

7. Composition as claimed in claim 5, wherein the epoxide compound (B) has an epoxide equivalent of 150 to 1,000 and a molecular weight between 300 and 2,000.

8. Composition as claimed in claim 5 for the preparation of molded articles or sheet-like structures by curing.

9. Composition as claimed in claim 8, wherein the curing is effected in the presence of water.

* * * * *